Sept. 24, 1940.  F. E. CHAMBERLAIN  2,215,688
SHAMPOO HEATER AND DISPENSER
Filed March 13, 1939   2 Sheets-Sheet 1
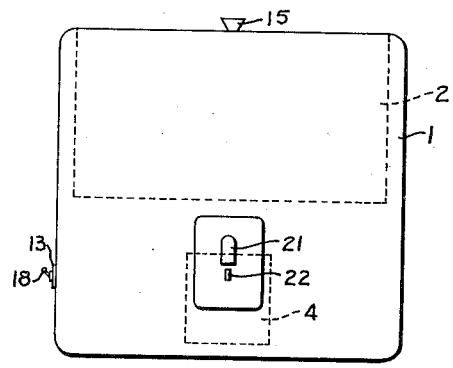
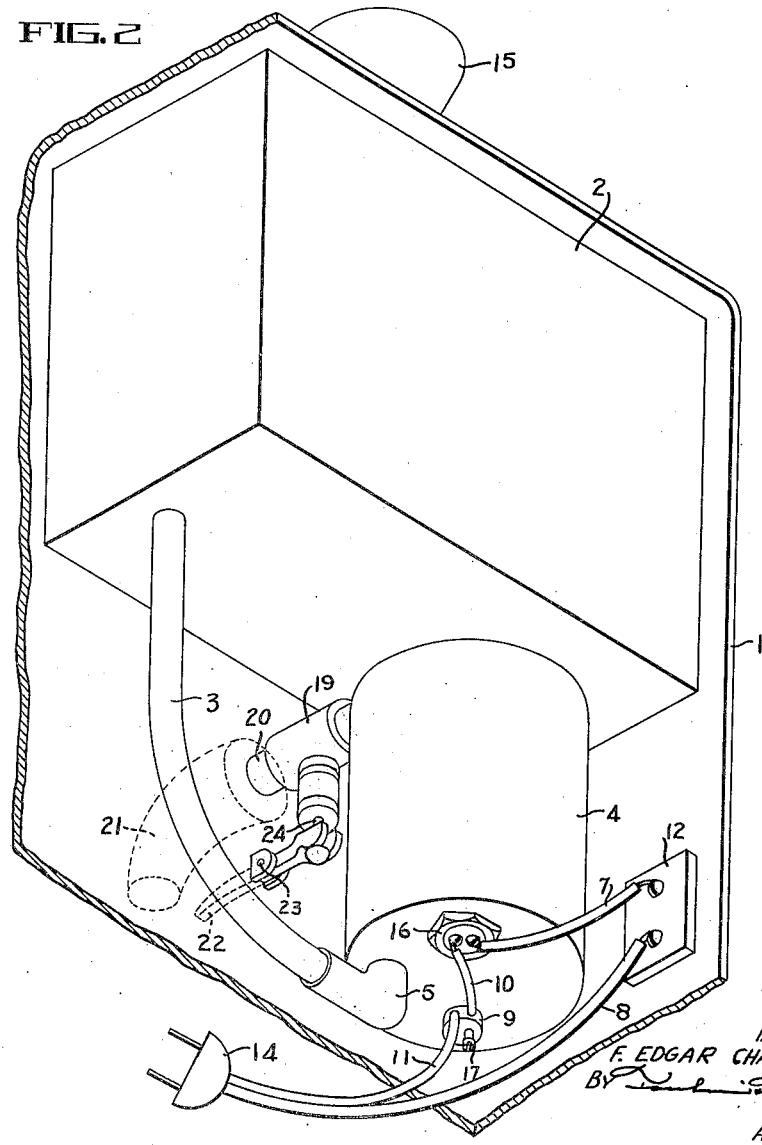
INVENTOR
F. EDGAR CHAMBERLAIN
BY
ATTORNEYS Sept. 24, 1940. F. E. CHAMBERLAIN 2,215,688
SHAMPOO HEATER AND DISPENSER
Filed March 13, 1939 2 Sheets-Sheet 2
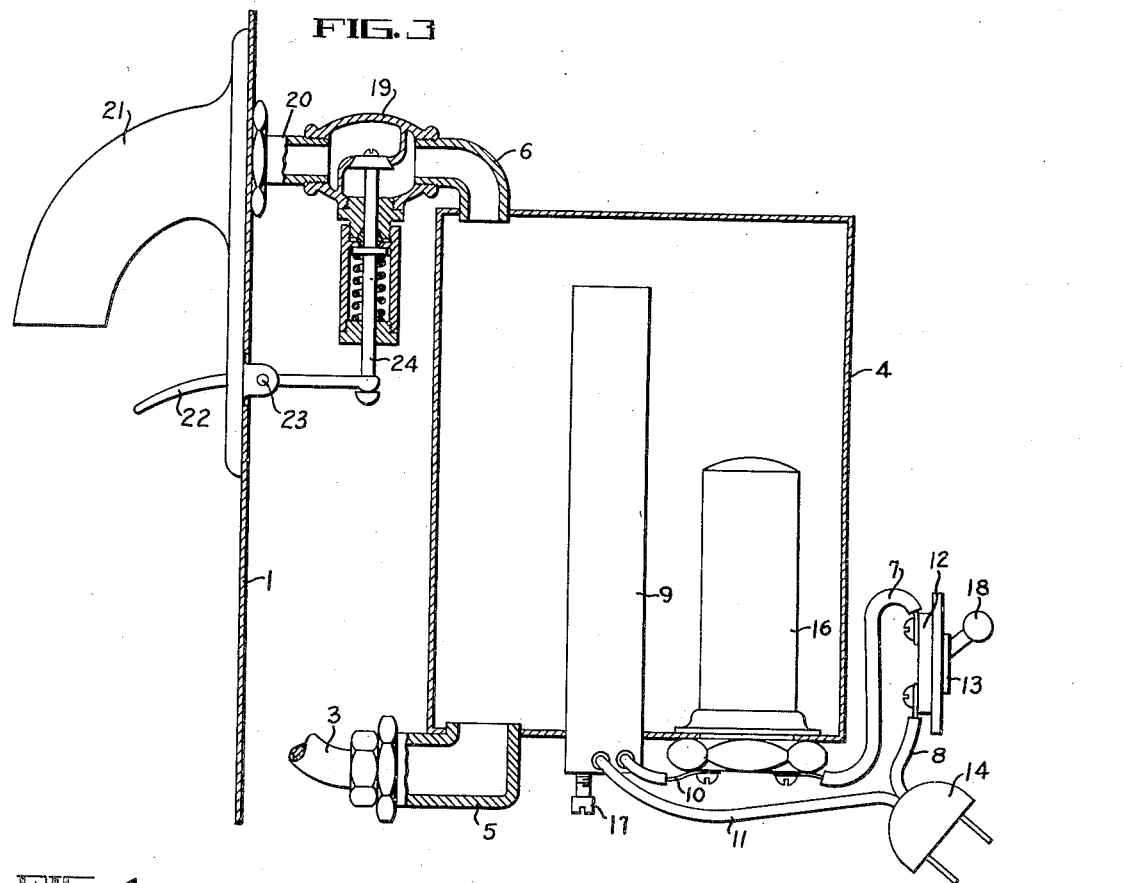
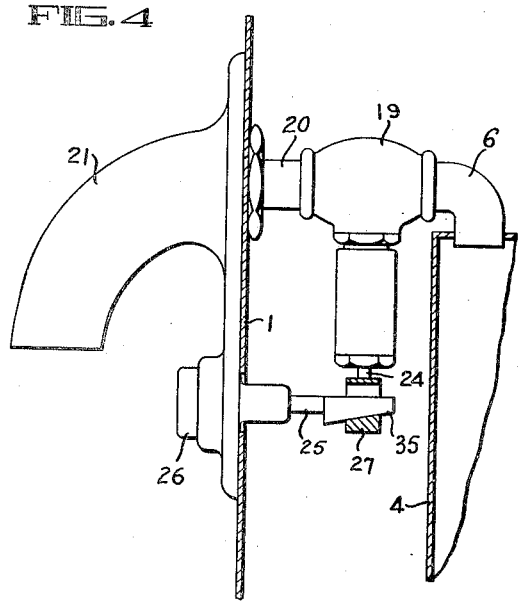
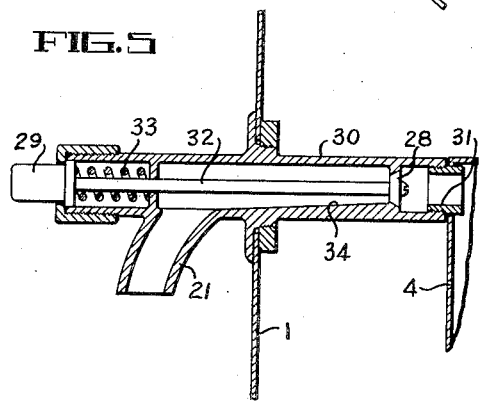
INVENTOR
F. EDGAR CHAMBERLAIN
ATTORNEYS Patented Sept. 24, 1940

2,215,688

UNITED STATES PATENT OFFICE 2,215,688

SHAMPOO HEATER AND DISPENSER

Frank Edgar Chamberlain, Bluffton, Ohio

Application March 13, 1939, Serial No. 261,665

4 Claims. (Cl. 219—38)

This invention relates to a heater and dispenser which is particularly adapted for use in heating and dispensing liquid shampoo or the like. The device constituting the present invention is especially suitable for use in beauty parlors, barber shops and the like where it is desirable that a supply of liquid shampoo at the proper temperature be conveniently and continuously available. While the invention will be particularly described as adapted for use in heating and dispensing liquid shampoo, it will be understood that it may also be adapted to heating and dispensing oil used in hot oil treatments, detergent liquids other than shampoo and similar liquids used in beauty shops and the like.

It is an object of this invention to provide a unitary device for heating and dispensing liquid shampoo, the working parts of which are hidden from view by a suitable cabinet or enclosure so as to eliminate the unsightly appearance of the shampoo section of the beauty shop and so as to facilitate mounting the device of this invention on a wall or the like.

Another object is to provide a heater and dispenser for liquid shampoo which is adapted to make available a continuous supply of liquid shampoo at the proper temperature for application to the scalp by means of a device which has a dispensing faucet operable in such manner that the operator may hold a container to receive the shampoo in one hand and with the same hand may operate the valve controlling the outflow whereby to fill the container. This feature of the invention is particularly advantageous in beauty shops and the like where frequently only one of the operator's hands is available for filling the shampoo container.

A further object is to provide a device of the foregoing type wherein the valved means for allowing shampoo to flow into the faucet is located in close proximity to the shampoo heating tank so that there is little or no shampoo between the valve and the heating tank and so that the shampoo which is left between the valve and the heating tank is maintained at substantially the temperature of the heating tank.

It is another object to provide a liquid shampoo heater and dispenser which is adapted to continuously as used heat the shampoo and make conveniently accessible the heated shampoo, whereby to eliminate the necessity for use of hot water in the preparation of the hot liquid shampoo as has been heretofore necessary.

It is another object to provide in a heater and dispenser for liquid shampoo a gravity storage tank, and a heating tank located below the storage tank and fed by gravity therefrom, the heating tank being provided with an electric heater and with thermostatic means controlling the action of the electric heater, the only connection between the heating tank and the storage tank being the gravity feed pipe, the valved dispensing faucet being connected to the top of the heating tank.

Still another object is to provide a modified form of the foregoing device wherein all of the shampoo on the faucet side of the valve is adapted to run out of the faucet so as to eliminate the presence of shampoo in the faucet which shampoo would be subject to cooling off with consequent disturbance of the temperature of the next drawn supply of shampoo.

Still another object is to provide a heater and dispenser of the foregoing type wherein the only parts visible are the decorative panel or enclosure, the filling spout for the storage tank and the faucet and valve operating means.

In the accompanying drawings, Fig. 1 is an elevation of the heating and dispensing device of this invention showing in dotted lines the storage tank and the heating tank.

Fig. 2 is an enlarged perspective from the rear of the device of Fig. 1.

Fig. 3 is a side sectional view of the lower portion of the device of Figs. 1 and 2, showing the heating tank and associated electrical connections, a portion of the gravity feed pipe leading into the heating tank and showing the faucet in side elevation and the valve controlling flow of heated shampoo thereto.

Fig. 4 is a view similar to Fig. 3, but showing a modified form of valve operating mechanism.

Fig. 5 is a side sectional view showing a still further modified form of valve and dispensing faucet.

Referring to the drawings in detail and particularly to the embodiment of Figs. 1 to 3, reference numeral 1 represents the decorative panel which may be made of steel or other suitable material lacquered on its exterior surface so as to present a pleasing appearance. Disposed within this decorative panel or cabinet 1 in the upper portion thereof is a storage tank 2 with a filler opening in its top which is aligned with a similar opening in the top of panel 1, and which is closed by a stopper 15 passing through the hole in the top of panel 1 and engaging the filler opening in the top of tank 2. Stopper 15 may be decorated on its exterior so as to present an attractive appearance.

Disposed in the lower portion of the panel or enclosure 1 is a heating tank 4 which is entirely separate from the storage tank 2 and is connected therewith only by gravity feed pipe 3 which connects with nipple 5 thereby feeding by gravity unheated liquid shampoo from storage tank 2 to the heating tank 4 as heated shampoo is drawn from said heating tank 4.

Disposed within heating tank 4 is an enclosed electric heating element 16 which projects upwardly into heating tank 4 from the bottom thereof. In electrical series with the heating element 16 is an enclosed thermostatically controlled switch 9 which likewise projects upwardly into heating tank 4 from the bottom thereof. Thermostat 9 is adapted to make or break the current of electricity supplied to heating element 16 in accordance with the average temperature to which the contents of tank 4 are heated. If desired, thermostatically controlled switch 9 may be controlled by the temperature in the upper portion only of the tank 4. However, it will usually be desirable to have it controlled by the average temperature of the contents of tank 4. Thermostatically controlled switch 9 is provided with an adjusting screw 17 which is adapted to regulate the temperature at which the thermostat will open or close the circuit to heating element 16. Usually, it will be desirable to have the outgoing heated liquid shampoo at a temperature of 106° F. since it has been found that this temperature is most suitable for application of the shampoo to the scalp without burning and yet with highly effective results. In order to have the outgoing shampoo at this temperature it will be necessary to have the average temperature in tank 4 at a figure slightly above 106° F. because the heating element will cause the lower portion of contents of tank 4 to be at a slightly higher temperature than the upper portion, although the action of convection currents will tend to counteract this effect and will tend to cause the heated shampoo to rise to the top of tank 4. The temperature of the outgoing heated shampoo may therefore be regulated by adjusting set screw 17 so as to obtain shampoo heated to the proper temperature.

Thermostatically controlled switch 9 is in series with electric heating element 16 by being connected thereto by conductor wire 10. The electric current is applied at plug 14 one side of which is connected to the other side of thermostat switch 9 by conductor 11, and the other side of which is connected to electric heating element 16 by wires 7 and 8 between which is located toggle switch 13. The base 12 of toggle switch 13 is mounted on the inside of panel 1 and the switch operating member 18 projects through panel 1 so as to be accessible to the operator from the left hand side of the device. Thus electric heating element 16 is adapted to be supplied with electricity whenever the average temperature in tank 4 drops below the selected temperature, and the passage of electricity through heating element 16 is discontinued when the average temperature in tank 4 rises above the predetermined temperature.

Connected with the top of tank 4 is a short nipple 6 which supplies heated shampoo to the face of a dispensing valve generally designated as 19 and leading from valve 19 through panel 1 is a pipe 20 which conveys heated shampoo to the dispensing faucet 21 which is mounted on the exterior of panel 1. Valve 19 may be of any suitable type and is operated by means of a lever 22 which is pivoted about pivot 23, located within the enclosure 1, and the inner end of which is formed with a cam surface engaging the lower end of valve stem 24. The left hand end of lever 22 projects through panel 1 and is readily accessible from the outside of the device. Thus an operator holding a cup or tumbler in one hand may push the edge of the cup or a finger of the hand holding it upwardly against lever 22 thereby operating valve 19 so as to cause heated shampoo to pass out through faucet 21 into the cup or container held in the hand. As hot shampoo is drawn from faucet 21 it will be understood that gravity action supplies tank 4 with the same amount of shampoo from supply tank 2 and that this gravity head causes the shampoo to flow outwardly through valve 19 and faucet 21 whenever valve 19 is open.

In view of the proximity of valve 19 to tank 4 and in view of the shortness of nipple 6, only a small amount of shampoo lies between valve 19 and tank 4 when valve 19 is closed. This small amount of shampoo will be maintained at substantially the same temperature as the shampoo within tank 4 for the reason that it is in such intimate contact therewith.

In the modification shown in Fig. 4 a valve and faucet exactly like those of Figs. 1 to 3 is employed. However, valve 19 is opened by pushing in button 26 and associated rod 25. Integral with rod 25 is a wedge 35 which engages cooperating means 27 associated with valve stem 24 whereby to pull valve stem 24 downwardly when button 26 is pushed inwardly. An operator may hold a container under faucet 21 and may simultaneously push button 26 inwardly either with the container or with the hand holding the container thus drawing hot shampoo with one hand only.

In the modification shown in Fig. 5 a combined faucet and valve operating device is shown. A conical valve member 28 is located at the inner end of conduit 30 which is in close proximity to tank 4 being connected thereto by a short nipple 31. Valve member 28 is adapted to be opened by pushing button 29 and integral rod 32 inwardly. Valve member 28 is normally held in closed position by spring 33 which presses against button 29. Faucet 21 is formed outwardly of panel 1 as above and is formed integral with conduit 30. The bottom of the inside of conduit 30 is formed with a sloping portion 34 so that all of the shampoo will drain out of the faucet 21 and that portion of conduit 30 located to the left of valve 28 when valve member 28 is closed thereby preventing the accumulation of shampoo between the faucet and the valve, which shampoo would cool and thus modify the temperature of the hot shampoo which was next drawn. This draining feature of Fig. 5 may be applied to the embodiments shown in Figs. 3 and 4 if desired. As will be apparent ordinarily two hands will be required in the operation of the embodiment shown in Fig. 5, one to hold the container into which the shampoo is to be drawn and the other to push button 29 inwardly.

It will be understood that I intend to comprehend within the invention such modifications as may be necessary to adapt it to varying conditions and uses.

In the claims the term "liquid shampoo" is to be understood as covering not only liquid soap solutions used as shampoo, but also similar liquids used in beauty shops and the like including other detergent liquids, oil used in hot oil treatments, and similar scalp treating preparations applied hot.

Having thus fully described my invention, what I claim as new and desire to secure by Letters Patent, is:

1. In a heater and dispenser for liquid shampoo, a decorative three-dimensional panel enclosing a gravity supply tank and a heating tank located below said supply tank in spaced relation thereto and freely connected therewith solely by a gravity feed line, an electrical heating element located within said heating tank, a thermostatic switch in series with said heating element and controlled by the temperature within said heating tank, said switch embodying means for adjusting the temperature of response thereof, a dispensing device located on the exterior of said panel, conduit means connecting said dispensing device with said heating tank, valve means in said conduit means located in close proximity to said heating tank, and means located on the exterior of said panel below said dispensing means for operating said valve means.

2. In a heater and dispenser for liquid shampoo, a decorative three-dimensional enclosing panel, a heating tank located within said panel, a thermostatically controlled heating element within said heating tank and controlled by the temperature within said tank, dispensing means located outside of said panel, conduit means freely connecting said dispensing means with said heating tank, a valve in said conduit means located within said panel closely adjacent said tank, a lever mounted on said panel, one end of which is adapted to control said valve and the other end of which projects outside of said panel in such proximity to said dispensing means that it is possible for an operator to simultaneously with a single hand hold a container beneath said dispensing means and operate said lever to control said valve.

3. In a heater and dispenser for liquid shampoo, a decorative three-dimensional enclosing panel, a gravity supply tank located in the upper portion of said enclosing panel, a heating tank located in the lower portion of said enclosing panel and having its top spaced a substantial distance below the bottom of said supply tank, gravity conduit means freely connecting said supply tank with the bottom of said heating tank, said conduit means constituting the sole connection between said supply tank and said heating tank, thermostatically controlled electrical heating means in said heating tank controlled by the temperature therein, dispensing means located outside of said panel, conduit means connecting said dispensing means with the top of said heating tank, a valve located in said last-named conduit means in close proximity to said heating tank, and means located just below said dispensing means for controlling said valve from outside of said panel, said last-named means being operable by a hand holding a container beneath said dispensing means.

4. In a heater and dispenser for liquid shampoo, a decorative right-parallelepipedal enclosing panel, a gravity supply tank located in the upper portion thereof and having a top filler opening, a detachable filler cap for said opening passing through the top of said panel into and closing said opening, a heating tank located in the lower portion of said panel and having its top spaced a substantial distance below the bottom of said supply tank, a gravity feed line freely connecting said supply tank to the bottom of said heating tank, an enclosed electrical heating element in said tank projecting upwardly from the bottom thereof, an enclosed thermostatic switch in electrical series with said element and projecting upwardly from the bottom of said heating tank to a point above said heating element and close to the top of said heating tank, adjusting means for adjusting the temperature at which said switch is responsive and accessible from below said heating tank, a dispensing spout outside of said panel, conduit means connecting said dispensing spout with the top of said heating tank, a normally closed valve in said conduit means closely adjacent said tank, and means for opening said valve and projecting through said panel to a point where said means is operable by a hand holding a container beneath said dispensing spout.

F. EDGAR CHAMBERLAIN.